US012337504B1

(12) United States Patent
Maltese et al.

(10) Patent No.: US 12,337,504 B1
(45) **Date of Patent: *Jun. 24, 2025**

(54) TOOL FOR MAKING AN AESTHETIC WALL SKIN

(71) Applicants: Daniel Maltese, Agoura Hills, CA (US); Scott Pitters, Hollywood, CA (US)

(72) Inventors: Daniel Maltese, Agoura Hills, CA (US); Scott Pitters, Hollywood, CA (US)

(73) Assignee: Pulp Art Surfaces LLC, Studio City, CA (US)

( * ) Notice: Subject to any disclaimer, the term of this patent is extended or adjusted under 35 U.S.C. 154(b) by 228 days.

This patent is subject to a terminal disclaimer.

(21) Appl. No.: 18/357,116

(22) Filed: Jul. 22, 2023

Related U.S. Application Data

(63) Continuation-in-part of application No. 15/946,723, filed on Apr. 5, 2018, now Pat. No. 11,752,664, which is a continuation-in-part of application No. 15/833,599, filed on Dec. 6, 2017, now Pat. No. 10,486,331, which is a continuation of application No. 14/050,026, filed on Oct. 9, 2013, now abandoned, which is a continuation-in-part of application No. 13/410,481, filed on Mar. 2, 2012, now abandoned.

(60) Provisional application No. 62/483,301, filed on Apr. 7, 2017.

(51) Int. Cl.
*B29C 33/38* (2006.01)
*B28B 7/22* (2006.01)
*E04F 21/04* (2006.01)

(52) U.S. Cl.
CPC ................ *B28B 7/22* (2013.01); *E04F 21/04* (2013.01)

(58) Field of Classification Search
CPC ...................... B29C 33/3814; B29C 2033/385
See application file for complete search history.

(56) References Cited

U.S. PATENT DOCUMENTS 2,920,701 A * 1/1960 Wells ........................ D21J 7/00 162/392
7,582,190 B2 * 9/2009 Salm ......................... D21J 3/00 162/227
2002/0121157 A1 * 9/2002 Knott ........................ B32B 5/18 75/392

* cited by examiner

*Primary Examiner* — James Sanders
(74) *Attorney, Agent, or Firm* — David M. Kleiman

(57) ABSTRACT

A tool for use in making a solid aesthetic wall skin sheet by slush molding. The tool comprises a porous tool base, a flat screen attached to the base, and a patterned grid attached to the screen and base.

8 Claims, 13 Drawing Sheets

TOOL FOR MAKING AN AESTHETIC WALL SKIN

This application is a continuation-in-part of U.S. patent application Ser. No. 15/946,723 filed Apr. 5, 2018, which claimed the benefit of priority to U.S. provisional patent application 62/483,301 filed on Apr. 7, 2017, and which was a continuation-in-part of U.S. patent application Ser. No. 15/833,599 filed on Dec. 6, 2017, which was a continuation of U.S. patent application Ser. No. 14/050,026 filed on Oct. 9, 2013, which was a continuation-in-part of U.S. patent application Ser. No. 13/410,481 filed on Mar. 2, 2012. The benefit of priority to each of the aforementioned applications is being claimed here, and the full content of each of the aforementioned applications is hereby fully incorporated by reference.

TECHNICAL FIELD

The present invention relates to the field of wall and surface coverings and more particularly the making of a three-dimensional wall covering having aesthetic features and finishes.

SUMMARY OF THE INVENTION

A "wall skin" as that term is used herein is a sheet of material having one or more ornamental elements that are usually embossed on the sheet, and that is intended to be applied to a wall surface. Wall skins are used by designers in film, television, theater, commercial stores, offices, and residential homes.

It is an object of the invention to provide an environmentally friendly wall skin product that is biodegradable and recyclable using recycled molded paper (molded pulp).

It is also an object of the invention to provide a wall skin in various shapes, sizes and thicknesses, and in an almost limitless variety of surface patterns which simulate brick, flag stone, rocks, architectural ornamentation and the like.

It is also an object of the invention to provide a wall skin which may comprise one or more elements, includes aesthetically pleasing patterns on a display surface, which may be shaped, sculpted, sanded, embossed or printed on them and can be easily attached to and fitted on an existing wall surface without the need for using expensive and/or toxic adhesives. The wall skins that are produced according to the method disclosed herein may also find use as acoustical elements in studios, theaters and the like or in drop ceilings.

A first slush molding method for the manufacture of aesthetic wall coverings includes the steps of: preparing a mockup of the wall skin with the desired surface pattern; creating a tool from the mockup, preparing a slurry of recycled paper, newspaper, paperboard and water; creating the basic wall skin by the use of slush molding of the slurry to shape the wall covering and eliminate the water from the slurry; drying the wall covering; cutting the covering to create one or more elements; and creating a surface pattern by finishing, sculpting, sanding, embossing or printing details on the display surface of the element(s).

Production of an aesthetic wall skin using said first slush molding method produces a sheet with a top surface that is relatively smooth, and a bottom surface that is relatively rough. Slush molding, as used during said first manufacturing method produces wall coverings with uneven front and rear surfaces, which does not readily facilitate the use of adhesives for wall mounting. Accordingly, the wall coverings produced in accordance with the first slush molding method according to may be attached to an existing surface or wall using conventional mechanical fasteners such as screws, nails or staples.

Die or CNC cutting of the elements used to form the wall skin according to the first method has been found to allow for adjacent elements to be better fitted together and reduces or eliminates the need to caulk the joints between adjacent elements or coverings. The dimensions of the dried parts have to be accurate in order to die cut them properly. The applicants found that by adding a surplus of pulp material beyond the intended finished die-cut patterned design of the wall covering this helps to solve the problem of parts warping and "potato chipping" as they free dry on a conveyor belt going through the drying oven. Thus, the wall coverings will have better tolerance in dimensions and detail and fit together more precisely.

Surface finishing of the front or display surface of the elements of the wall coverings includes shaping and texturing procedures, which may include, but not be limited to, sanding, carving, sculpting, stamping, printing and embossing to attain the desirable surface features, contours and textures.

Once the front or display surface(s) of the elements of the wall covering have been finished to create a desired pattern or contour, the final colors and surface features may be digitally printed on the front surface.

The elements of the wall covering can then be attached to a surface to form the covering for display. One or more wall coverings, each having one or more elements, may be arranged together to form a pattern on the wall surface to which they are attached.

It has been found that users of a wall skin will often fasten the wall skin sheet to a wall surface using staples or screws (as opposed to an adhesive placed in the back side) that can be difficult and costly to hide from view after installation. Multiple aesthetic wall skin sheets must often be used together to cover the desired surface area on a wall surface. To achieve the desired visual appearance this requires that the multiple aesthetic wall skin sheets used fit together on the wall surface accurately and tightly. Even a small gap between installed wall skin sheets can grow horizontally and vertically resulting in a situation that is not visually acceptable to an end user.

It is also very often desirable to be able to apply colors, designs, and/or images onto the top ornamental surface of an aesthetic wall skin sheet which will be displayed once the wall skin sheet is installed. Scenic artists may be employed to do this, but such professional artists can be difficult to find outside of the film, television, and theater industries. Accordingly, it is desirable to be able to use technologies such as digital printing to apply colors, designs, and/or images onto the top ornamental surface of an aesthetic wall skin sheet.

However, the top ornamental surfaces produced using the first slush molding manufacturing process can often be very grainy and porous making it difficult or impossible to effectively apply colors, designs, and/or images onto the surface with digital printing. Furthermore, when the aesthetic wall skin sheet top ornamental surfaces are digitally printed on it can be extremely difficult to find an available paint color that will match the applied color, design and/or image. This can prevent the effective patching over with paint of the mechanical fasteners (e.g. screws, staples, etc. . . . ) that may have been used for installation of the aesthetic wall skin sheet. The slush molding process also typically produces a very rough finish on the bottom side of the wall skin sheet which can prevent the wall skin sheet from being secured sufficiently under suction to a digital printer conveyor belt or table system. This can adversely affect the ability to print well on the wall skin sheet.

It has also been found that the oven drying step in said first slush molding method of manufacture molded fiber product method can fail to provide acceptable tolerances, consistent dimensions, and flat aesthetic wall skin sheets. Even when the aesthetic wall skin sheets are within tolerance the elements of the aesthetic wall skin sheet can take on unpredictable shapes and positions because the recycled newsprint and paper that goes into the paper pulp mixture used in the process can vary in consistency. This is inherent in said first slush molding method employed using recycled materials.

Accordingly, applicants have invented a wall skin sheet with new features and that is preferably made by a different thermoforming process. The new wall skin sheet helps resolve the aforementioned issues of gaps between adjacent wall skins when installed and the difficulty of using digital printing with wall skins manufactured using the slush molding process.

As described in greater detail herein the applicants' inventive new wall skin includes the new feature of a backer guide that facilitates the installation of multiple wall skin sheets onto a wall surface with accurate and tight fitting joints so that there will be no gaps between adjoining aesthetic wall skin sheets, and any mechanical fasteners that may be used in installation will be hidden from view.

As also described in greater detail herein, the preferred method of making the applicants' new wall skin with a backer guide is a thermoforming process instead of the slush molding process. The thermoforming process can produce smoother surfaces and eliminate the problems caused by the oven drying used in slush molding, all of which helps to facilitate installation and the ability to digitally print on the top ornamental surface of the wall skin sheet.

DESCRIPTION OF THE INVENTION

A wall covering manufactured using a first slush molding method is illustrated in FIGS. 1-4 and is generally designated by the numeral 10. Wall covering 10 may include one or more elements 12 that can be used together to form a desired pattern on a wall 24. It will be understood by those having ordinary skill in the art that the wall covering 10 may be used in conjunction with a vertical wall 24 as well as on ceilings, floors or angled surfaces as well.

Figure 3:
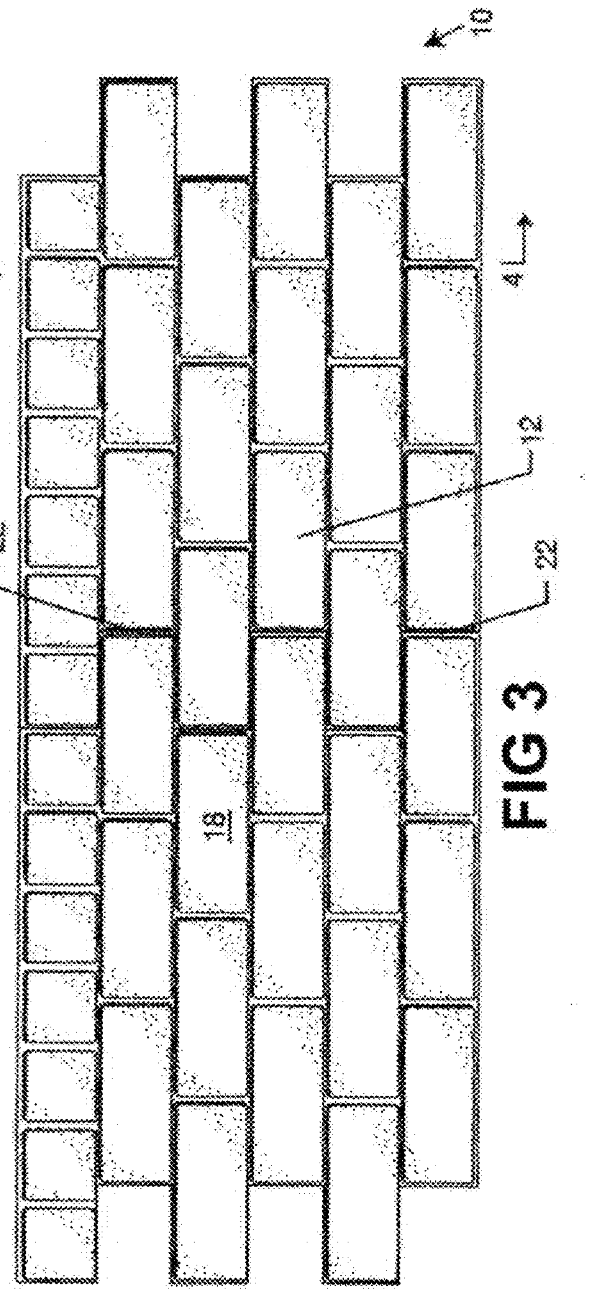
FIG. 3 illustrates a front elevational view of an exemplary wall skin without a backer guide manufactured using slush molding.
Figure 4:
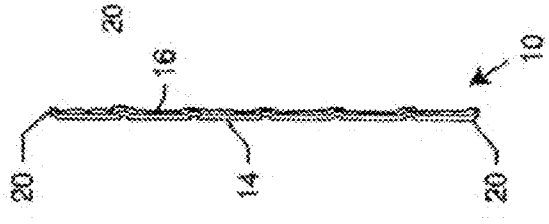
FIG. 4 a sectional side view of exemplary wall skin without a backer guide manufactured using slush molding taken at line 4-4 in FIG. 3.

Each element 12 includes front or display surface 14, rear surface 16 and edges 20. Display surface 14 includes surface pattern 18, which, in the example illustrated in FIGS. 1-4, depicts a brick surface. Adjoining elements 12 are fitted together at joints 22, as best illustrated in FIG. 3, such that no gaps appear between adjacent elements 12.

Figure 5:
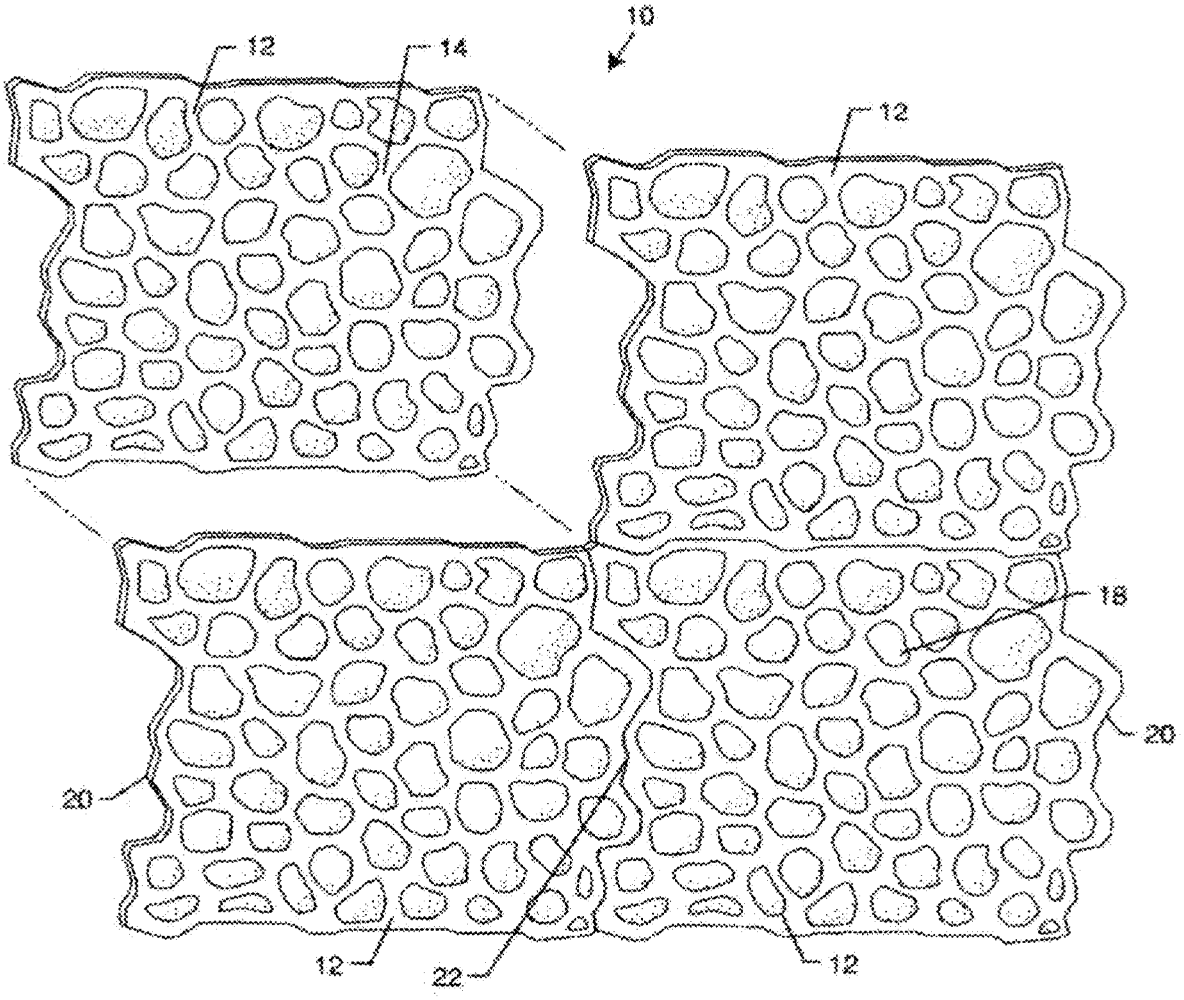
FIG. 5 illustrates a front elevational view of the elements forming an alternative embodiment of an exemplary wall skin without a backer guide manufactured using slush molding.

FIG. 5 illustrates wall covering 10 having a surface pattern 18 that simulates a rock wall. Surface pattern 18 may be created by a number of methods of surface preparation on display surface 14, such as sanding, carving, or embossing, and other details may be painted or digitally printed on display surface 14.

A wall covering 10 may be made with a variety of thicknesses depending on the application and can be controlled by the slush molding process. The fabrication of a wall covering 10 by the use of slush molding results in a wall covering 10 having a rough uneven display surface 14 and a moderately rough uneven rear surface 16. Such a configuration is not conducive to the use of conventional adhesives to attach wall covering 10 to surface 24. Wall covering 10 and the elements 12 that are used to form it may be attached to surface 24 by means of conventional fasteners such as nails, screws, staples or tape.

Figure 6:
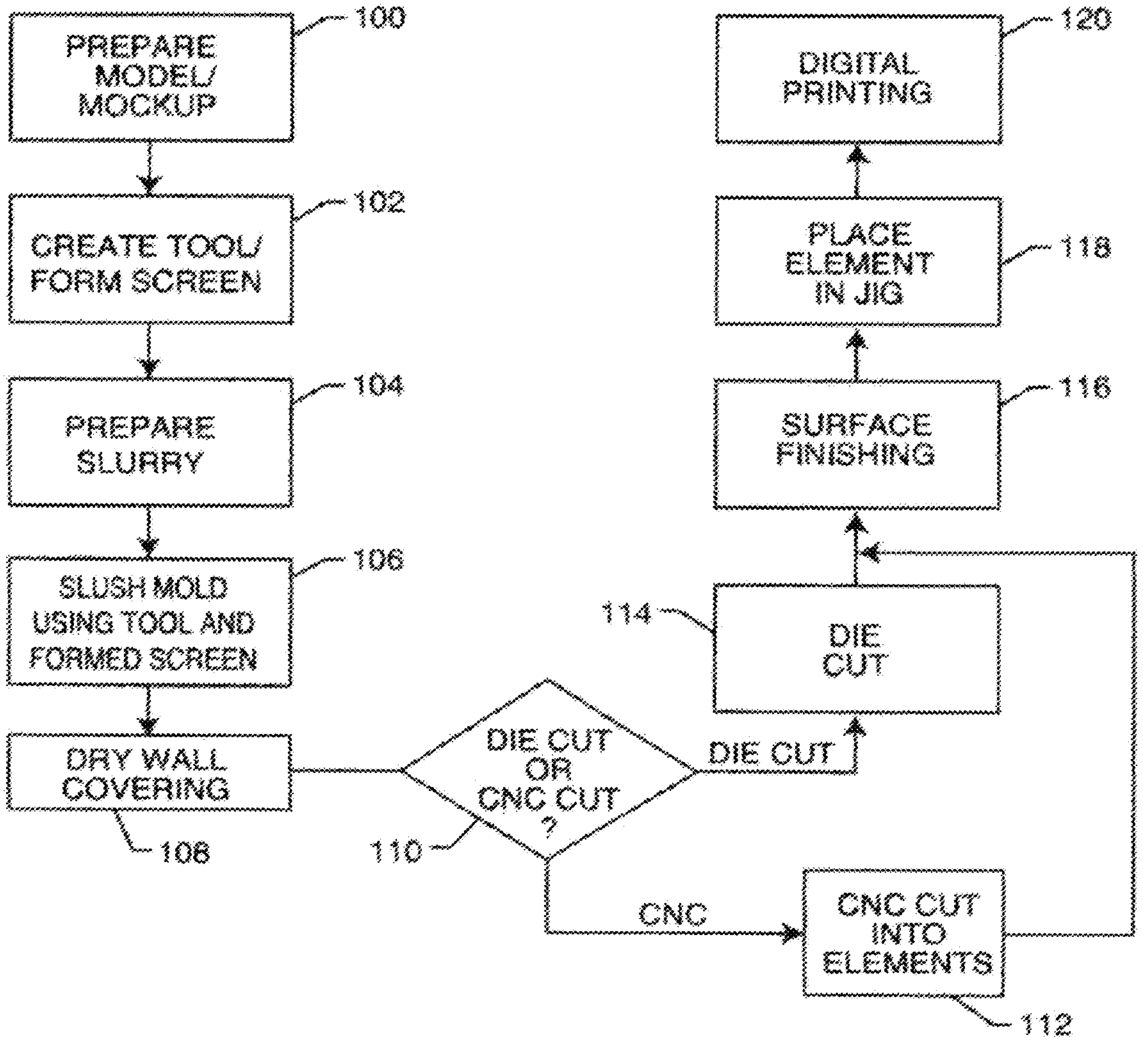
FIG. 6 illustrates a block flow diagram of the steps used in manufacturing the exemplary wall skin without a backer guide using slush molding.
Figure 7:
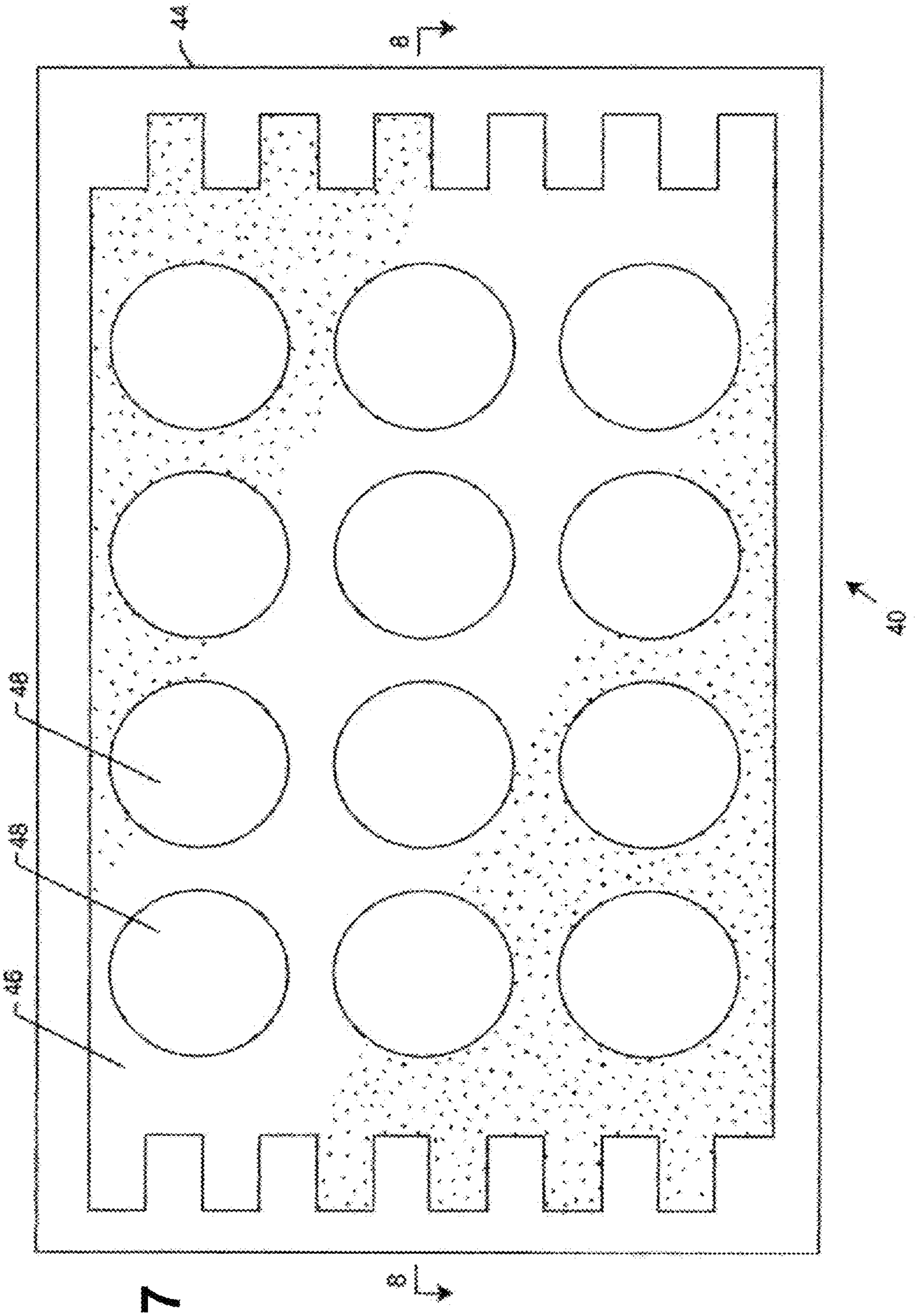
FIG. 7 illustrates a block flow diagram of the steps used in manufacturing the exemplary wall skin without a backer guide using slush molding.
Figure 8:
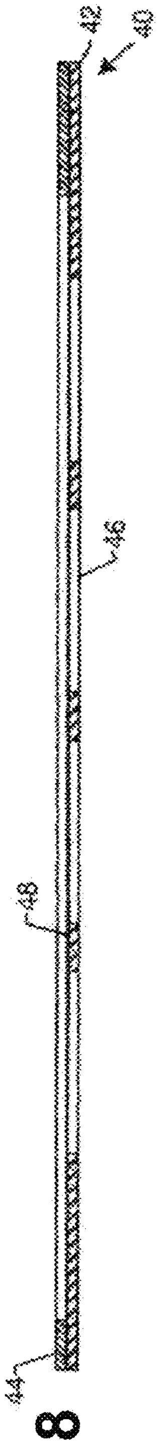
FIG. 8 illustrates a sectional side view of a jig taken along line 8-8 of FIG. 7.

FIG. 6 illustrates the steps of a method of manufacturing of a wall covering 10 in accordance with the slush molding method. The method of manufacturing incorporates the use of a specially designed jig 40, which is illustrated in FIGS. 7-8. Jig 40 includes a support surface 42, which secures and positions each element 12 as it undergoes digital printing on a flatbed printer during manufacturing. Support surface 42 includes a shaped perimeter 44 that is designed to follow the edges of element 12. Preferably support surface 42 is a foam core material to provide a close fit between jig 40 and element 12. Jig 40 makes the element 12 air tight during printing and provides consistent positioning of the elements and holds them flat.

Lower surface 46 of jig 40 is stretched and fixed to support surface 42. Preferably, lower surface 46 is made of a thin flexible plastic, such as Sintra®. Lower surface 46 includes openings 48 to allow for suction to hold an element 12 stable and flat during printing. The printer used during the method according to the present invention is most effective on flat surfaces, and jig 40 allows the printer to print more effectively on display surface 14. Without the use of jig 40, the printer used during the method of manufacturing according to the applicants' prior invention could be damaged, which would be expensive to repair.

Once it is determined what the desired appearance of a wall covering 10 should be, the first step 100 is to prepare a mockup or model of the desired wall covering 10 or element 12. From the model, at step 102, a molding tool and conforming screen are prepared. The tool is generally made of a composite material and includes the desired surface pattern depicted by the mockup. The screen is generally of a porous copper construction and is shaped to conform to the surface pattern formed by the tool. It may be necessary, for certain surface patterns, to remove portions of the screen to preserve the integrity of the screen and the surface pattern.

At step 104, a slurry blending recycled paper, cardboard and water is prepared. At step 106, the slurry is pumped into a vat in the slush molding machine where the tool is immersed in the slurry. As the level of the tool rises, the slush molding machine uses suction to remove the slurry water from the tool and screen. Thickness of the wall covering 10 is determined during this step by monitoring and controlling the amount of slurry injected into the tool and screen.

At step 108, once the slush molding process is completed, wall covering 10 is removed from the slush molding machine and conveyed to a dryer. At step 110, the user then makes a decision whether to divide wall covering 10 into a plurality of elements 12, either by use of Computer Numerical Control (CNC) cutting, step 112 (which may be by means of a water jet, an oscillating knife, a rotating blade or a laser), or alternatively, by die cutting, step 114. Use of the cutting step 112 or 114 forms edges 20 that configure joints 22 so that elements 12 fit closely together, leaving no gaps, and does not require joints 22 to be caulked.

At step 116, display surface 14 of each element 12 is finished and the surface pattern 18 is formed by using a variety of procedures, such as sanding, carving, embossing or the like to create the desired and realistic surface pattern 18 envisioned at the beginning of the process.

At step 118, each element 12 is secured in jig 40 in preparation for printing. Each jig 40 must be designed for a particular element 12 and surface pattern 18.

Step 120 in the production process may include digitally printing colors and surface features on display surface 14 to provide further details to surface pattern 18.

The completed elements 12 of wall covering 10 can be mounted to wall 24 by use of conventional fasteners 26, such as screws, nails, staples, tape, Velcro® hook and loop fasters and the like, form wall covering 10.

Figure 10:
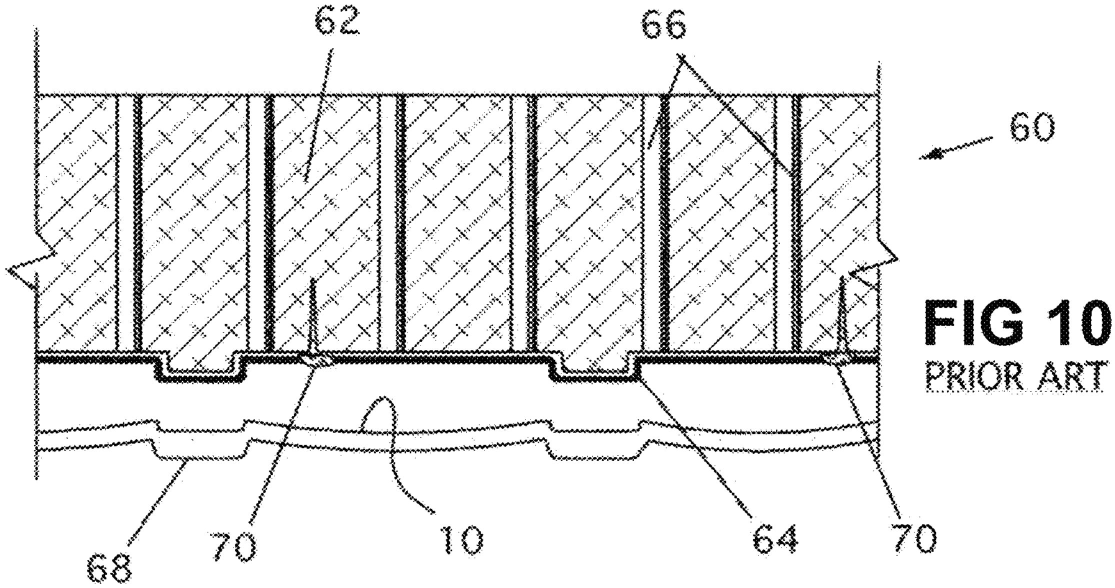
FIG 10 PRIOR ART
FIG. 10 illustrates a partial sectional view of a fabrication tool according to the prior art.
Figure 9:
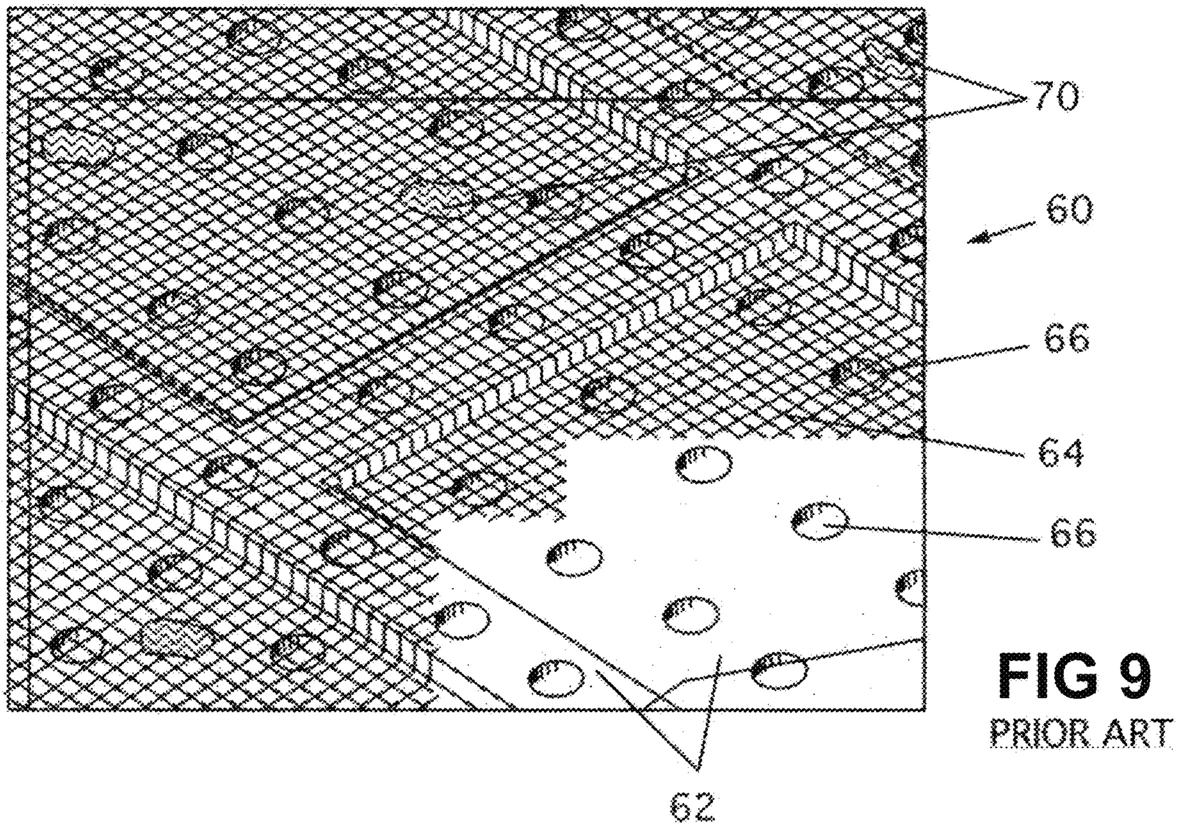
FIG 9 PRIOR ART
FIG. 9 illustrates a perspective view of a fabrication tool according to the prior art.
Figure 12:
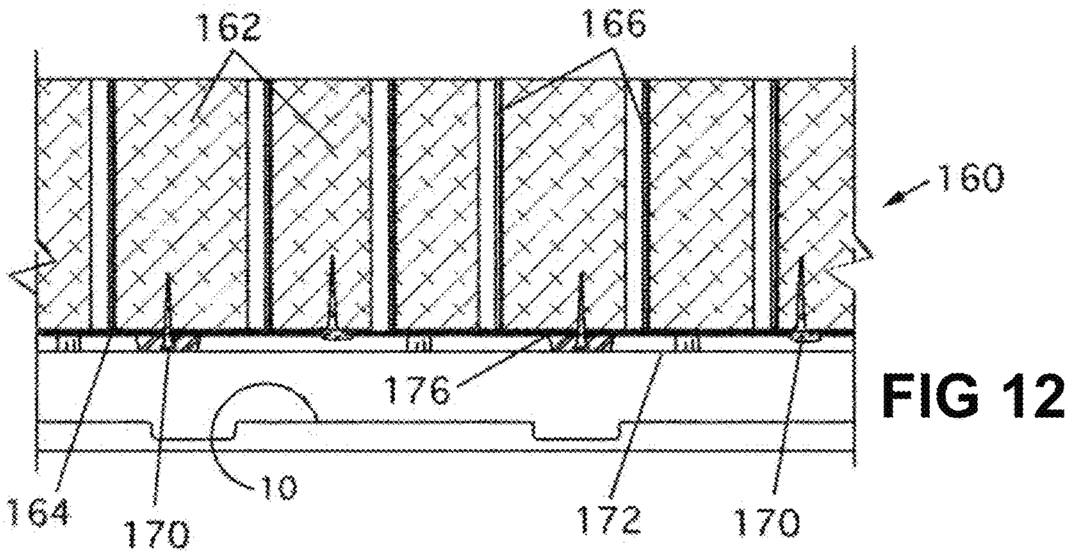
FIG. 12 illustrates a partial sectional view of a fabrication tool for manufacturing a wall skin manufactured using slush molding.
Figure 11:
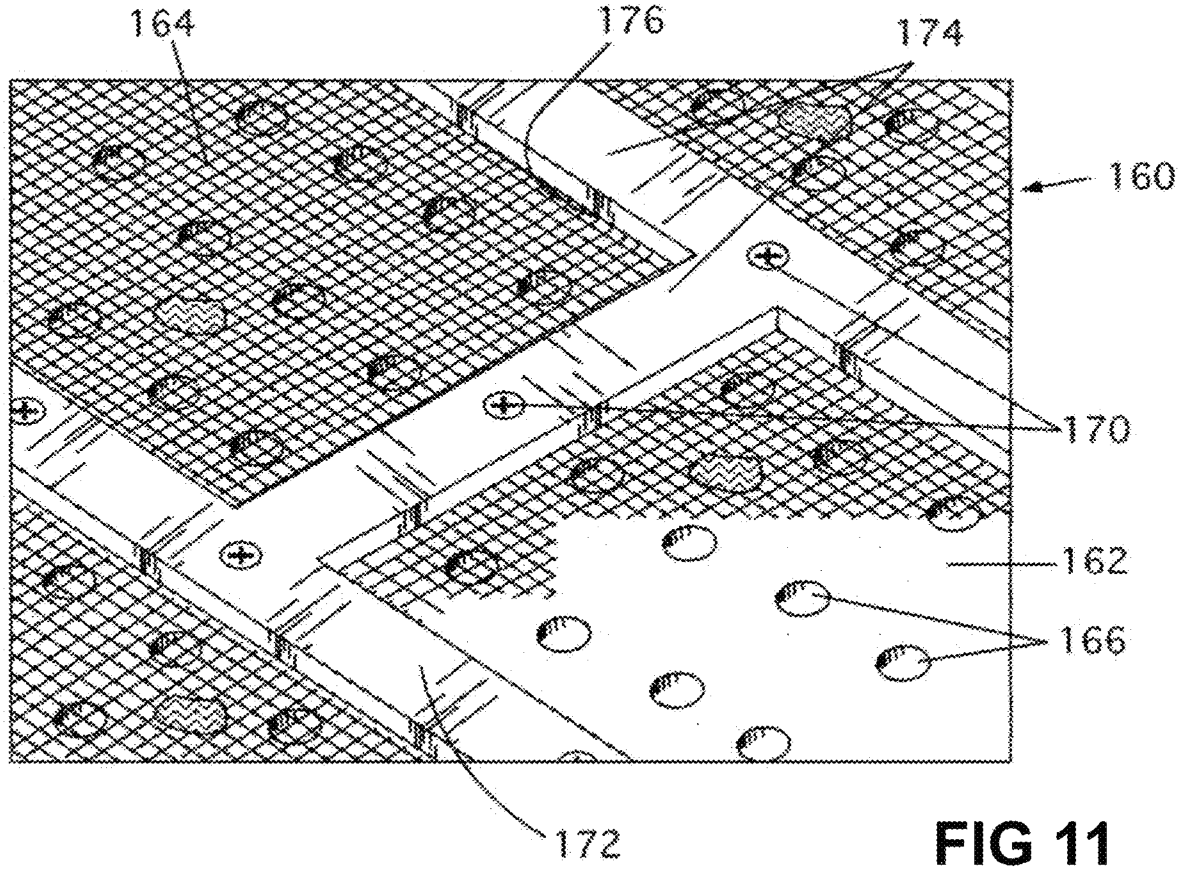
FIG. 11 illustrates a perspective view of a fabrication tool for manufacturing a wall skin manufactured using slush molding.
Figure 13:
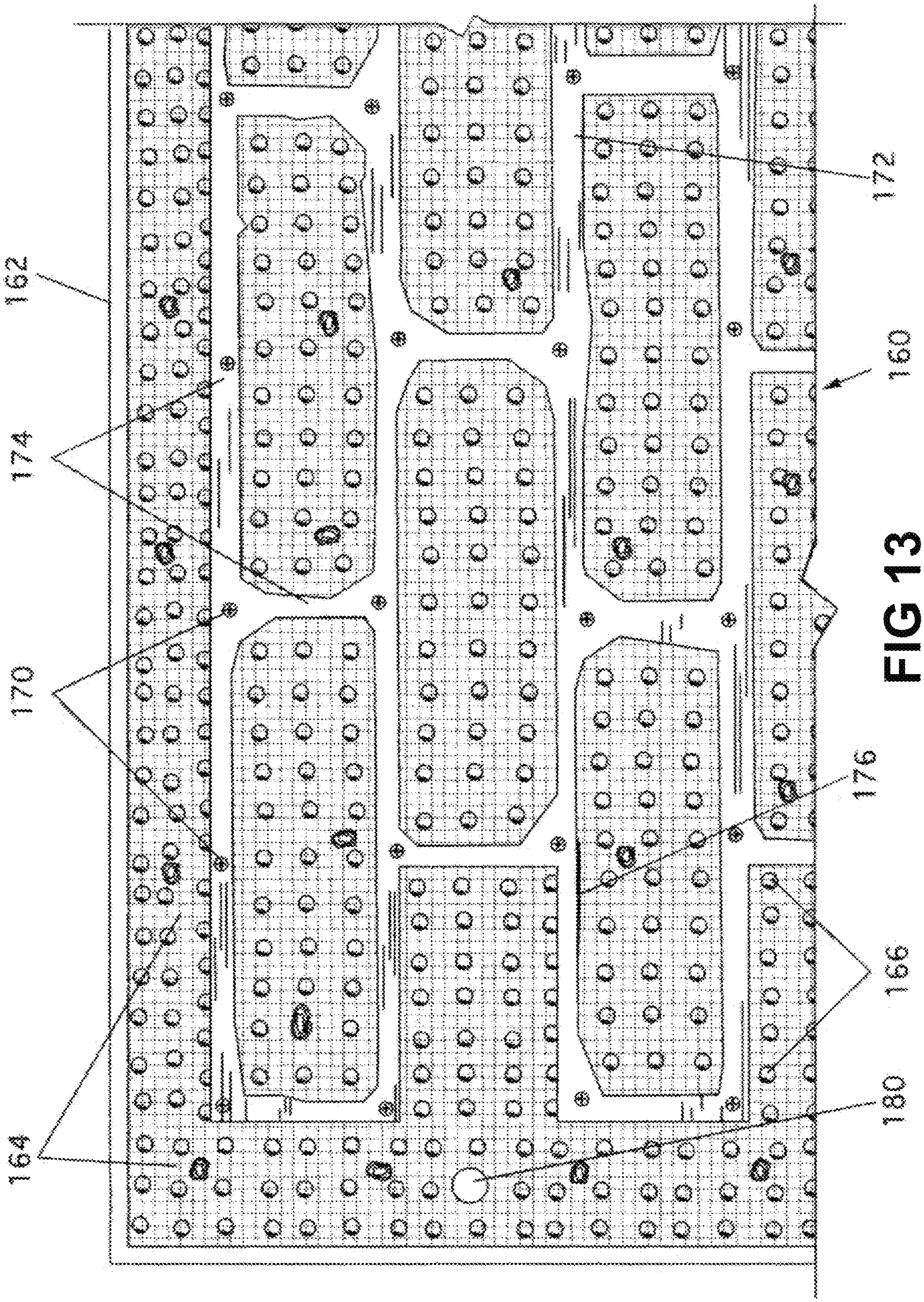
FIG. 13 illustrates a plan view of a patterned grid for use in conjunction with a fabrication tool for manufacturing a wall skin manufactured using slush molding.

In another aspect of the present invention, the inventors have developed a reusable and interchangeable tool for use in the slush molding process to create aesthetic wall coverings 10. The conventional tool 60, also noted as prior art, is illustrated in FIGS. 9-10. A shaped poured tool base 62 includes drain holes 66 for water removal during the slush molding process. Screen 64 is configured to fit the various shapes in tool base. Screen 64 and poured tool base 62 together form the conventional tool 60 that is used. Such contouring is time consuming and labor intensive and much of it must be done by hand. Screen 64 is then physically attached to the shaped poured tool base 62 by means of soldering between the screen and conventional connectors 70 inserted in shaped poured tool base 62, such as screws, attached to the tool base 62. Screen 64 will retain the pulp while water is suctioned out of the drain holes 66 during the pulp molding process.

Conventional tool 60 is specifically made for a specific design of wall covering 10. For example, if a wall covering 10 simulating bricks is desired, tool 60 may be used only for such a design.

FIGS. 11-14 illustrate an embodiment of new improved tool 160 for use in the slush molding process in accordance with the present invention. Tool 160 includes a flat porous tool base 162 having drain holes 166. The porous tool base 162 could be made of steel, aluminum or a pourable material, for example. Screen 164 is attached to porous tool base 162 by means of conventional methods, such as soldering, conventional connectors, such as screws inserted in porous tool base 162. Note that in tool 160, screen 164 is not manipulated to conform to particular shapes but is instead is flat when attached to porous tool base 162, thus substantially reducing the labor time required to form tool 160 compared to prior art tool 60.

Once screen 164 is attached to porous tool base 162, patterned grid 172 consisting of grid members 174 is placed on top of screen 164 and attached by attachment means 170 (which may be one of several conventional types of attachment means, such as screws). Caulking 176 is used to fill in gaps where grid members 174 fit on top of screen 164 to prevent unwanted buildup of slurry in these gaps during the process of manufacturing.

Figure 14:
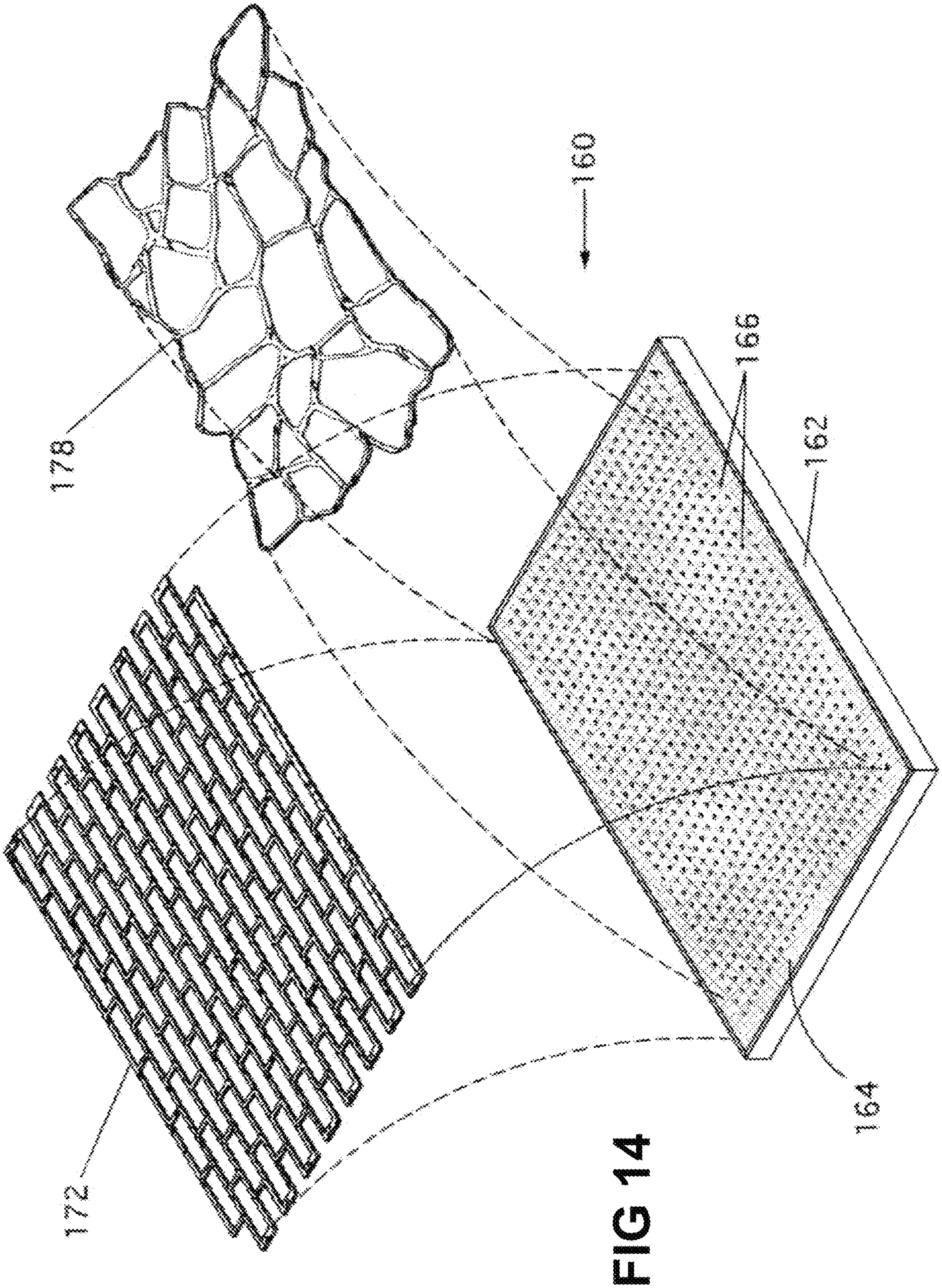
FIG. 14 illustrates how different patterned grids may be used with the same tool base and screen in a fabrication tool for manufacturing a wall skin manufactured using slush molding.

Grid 172 provides the desired shape of wall covering 10, such as a brick or tile surface. Once the desired wall covering 10 is produced, as illustrated in FIG. 14, patterned grid 172 (which for purposes of illustration is shown in a brick pattern) may be detached from porous tool base 162 and screen 164 and replaced by an alternative patterned grid 178 (which for purposes of illustration is shown in a flagstone grid) and attached as discussed. Thus, tool 160 provides great versatility and may be reused to create a new pattern of wall covering 10. Tool 160 provides a substantial cost and time savings over the prior art tool 60, which requires the creation of a separate new tool, with a poured shaped tool base 62 and a screen 64 shaped to conform to the contours of poured shaped tool base 62 for each design of wall covering 10. Locator peg 180 is used during the die cutting of parts to ensure proper alignment and precise dimensioning of finished wall covering elements.

The buildup of material on the patterned grid 172 is not as thick on the forming screen 164, which advantageously provides finished wall coverings which are more flexible and may be attached to a curving wall, are flatter for digital printing, and flatter for shipping and storing, thus saving space. Patterned grid 172 enables the formation of aesthetic details, for example, the grout lines in a brick or block wall aesthetic wall covering. The inventors have also found that by adding a surplus of pulp surrounding the various patterned grids beyond the intended finished die-cut patterned design of the wall covering solves the problem of parts warping and "potato chipping" as they free dry on the conveyor belt going through the drying oven. The dimensions of the dried parts have to be accurate in order to die cut them properly. Creating aesthetically correct and pleasing wall coverings using slush molding raises problems not found in making the usual packaging products made by slush molding for the packaging industry, in that the wall coverings must fit together precisely with high tolerance in dimensions and detail. Porous screen tool base 162, flat screen 164, and patterned grid 172 in combination comprise the improved tool 160 according to the present invention.

The advantages provided by the improved fabrication tool in accordance with the present invention for slush molding of aesthetic wall coverings include the ability to have consistent production with dimensionally accurate parts; providing a flat front surface when the detail is required; providing better control over part finishing in that the parts lay flat for printing and shipping; reduced tooling costs; reduced wear and tear on the tooling; and reduction in energy use and material waste during production.

Figure 1:
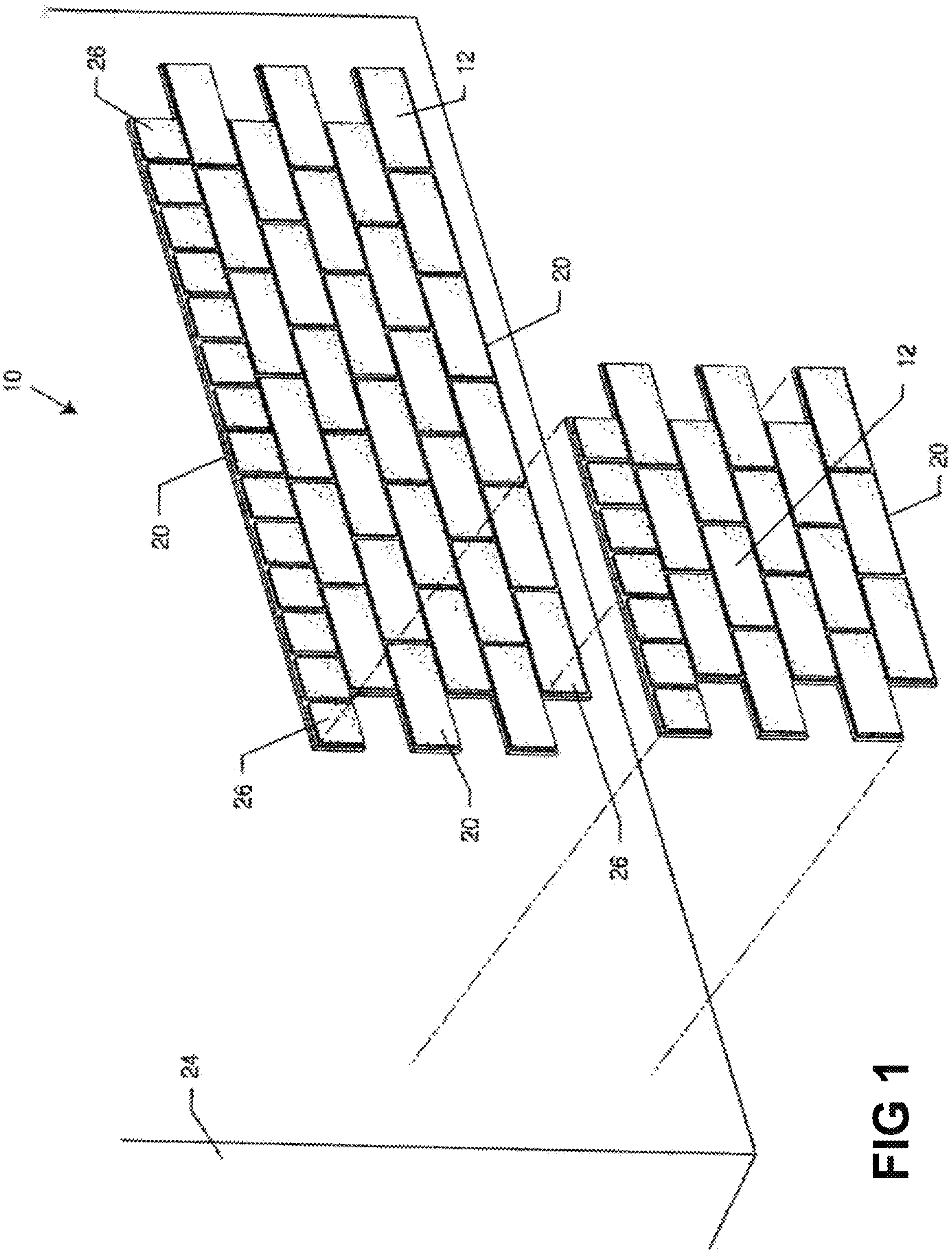
FIG. 1 illustrates perspective view of the elements forming an exemplary wall skin without a backer guide manufactured using slush molding.
Figure 2:
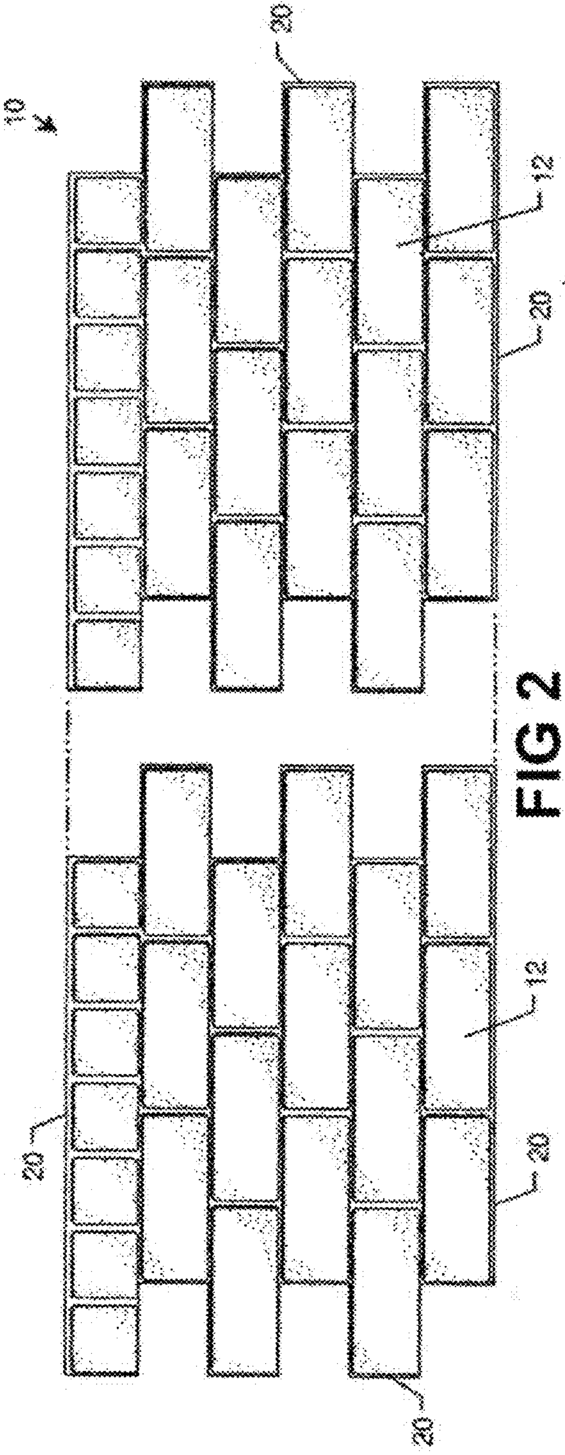
FIG. 2 illustrates a front elevational view of the elements forming an exemplary wall skin without a backer guide manufactured using slush molding.
Figure 15:
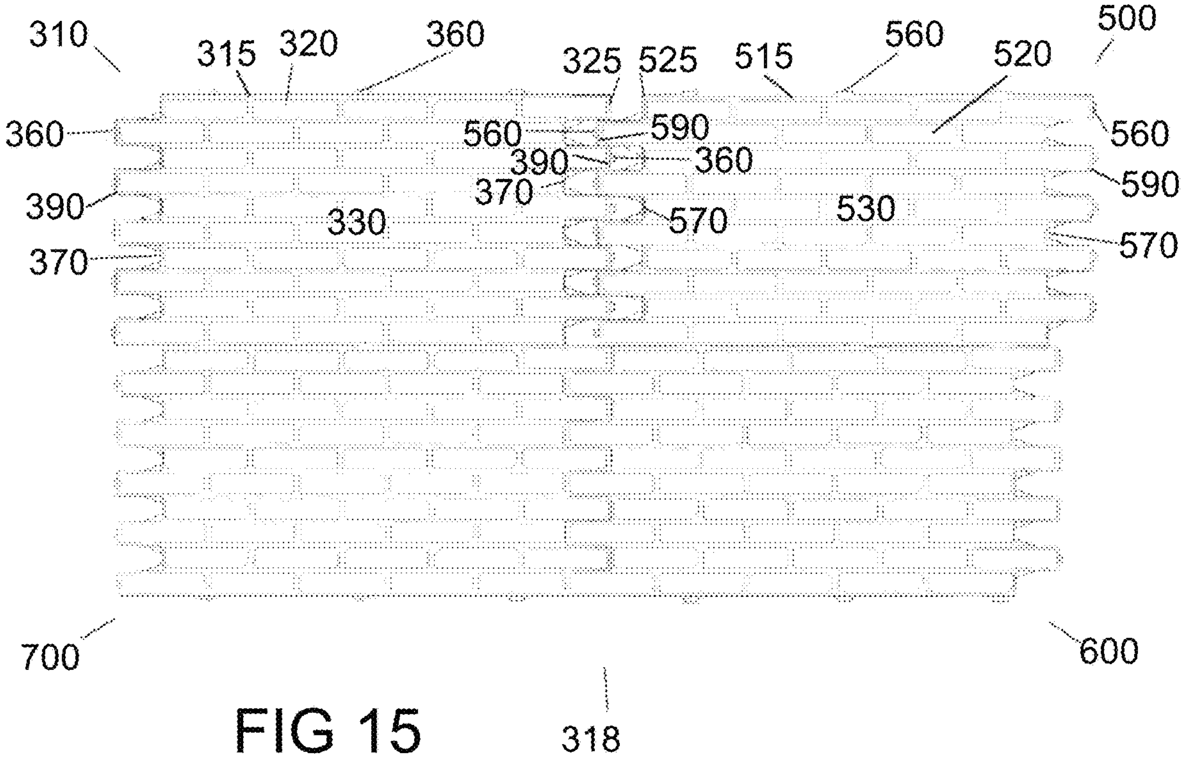
FIG. 15 is a top view of a wall covering comprised of a plurality of wall skin sheets having backer guides, with a wall skin sheet positioned to be joined to an adjacent aesthetic wall skin sheet.
Figure 16:
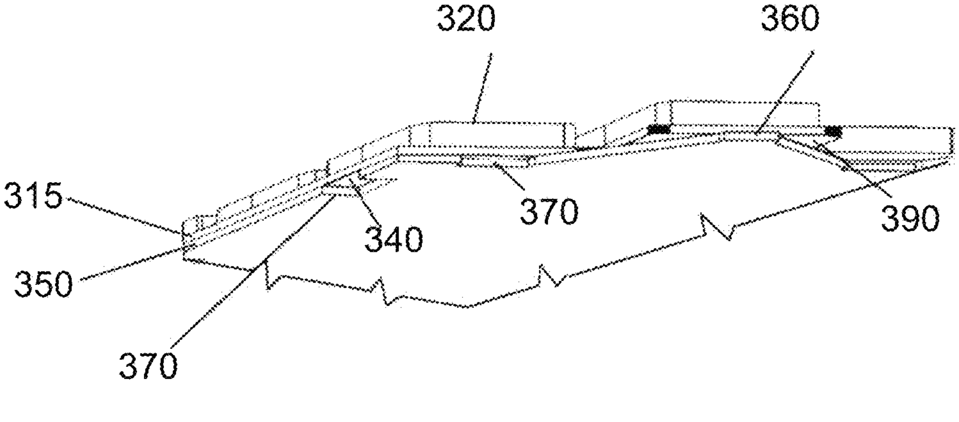
FIG. 16 is an enlarged bottom elevation perspective view of an edge portion of wall skin sheet with a backer guide attached.
Figure 17:
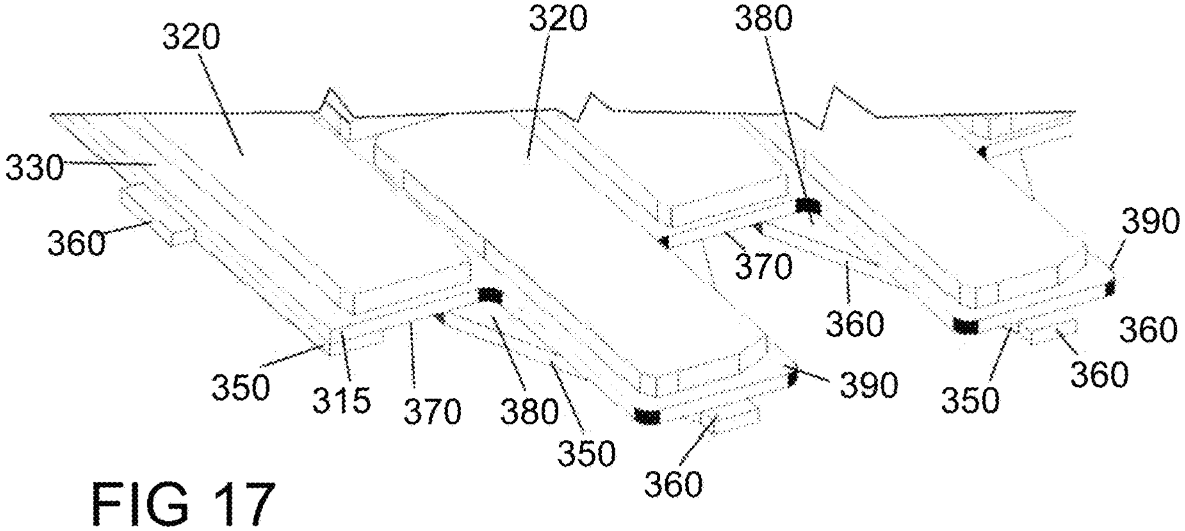
FIG. 17 is an enlarged top elevation perspective view of an edge portion of a wall skin sheet with a backer guide attached.

Referring to FIG. 15 a preferred embodiment of an aesthetic wall skin sheet 310 being joined together with adjacent wall skin sheets is shown. Each aesthetic wall skin sheet 310 comprises a body 315 having a top surface 330 and bottom surface 340. At least one ornamental element 320 is located on top surface 330. An ornamental element may be, by way of example and not limitation, an embossed feature in the shape, pattern, and/or texture of a certain type of wall construction material. In FIG. 1 ornamental element 320 is in the form of a brick, such that when installed on a wall surface multiple aesthetic wall skin sheets 310 may be combined into a wall skin covering 318 that gives the appearance of a brick wall. It is anticipated that top surface 330, including ornamental elements 320, may have colors, designs, and/or images applied to them to convey the desired visual impression (e.g. red clay brick, river rocks, etc. . . . ). While the embodiment shown in FIG. 15 is one with ornamental element 320 being in the form of a brick, it should be noted that the ornamental element 320 may be representative of any shape, pattern, or texture including, by way of example and not limitation, brick, flagstone, cut stone, cement block, tile, river rock, stucco, wood, etc. . . .

Referring to FIGS. 15-19 in the preferred embodiment of the present invention there is a backer guide 350 attached to bottom surface 340 of body 315 of aesthetic wall skin sheet 310. Backer guide 350 has one or more tabs 360 and recesses 370 all of which are located beneath body 315 when backer guide 350 is attached. An exposed fastener area 380 of tab 360 extends out beyond the periphery edge 390 of body 315 of aesthetic wall skin sheet 310. When applying aesthetic wall skin sheets onto a wall surface to make a wall skin covering 318 the backer guide 350 of a first aesthetic wall skin sheet 310 is first placed against the wall surface in a desired location and then is fastened to the wall surface by installing one or more fasteners (e.g. one or more staples or nails) through one or more fastener areas 380 that extend beyond the periphery edge 390 of body 315 of first aesthetic wall skin sheet 310. This secures the first aesthetic wall skin sheet 310 to the wall surface.

After installation of a first aesthetic wall skin sheet 310 as described above a second aesthetic wall skin sheet 500 to be applied to the wall surface adjacent to the fastened first aesthetic wall skin sheet 310 may be installed by interlocking (i.e. keying into place) complimentary tabs and recesses of the first and second aesthetic wall skin sheets. Accordingly, second aesthetic wall skin sheet 500 is manually maneuvered (e.g. by a sliding action) such that tabs 360 and 560 will interlock with complimentary recesses 370 and 570. The interlocking of a tab and recess forms a finger joint. More specifically, the backer guide 550 of the second aesthetic wall skin sheet 500 is placed substantially against the wall surface, and aesthetic wall skin sheet 500 is then maneuvered manually into a position such that each tab 560 located along joining edge 525 of the second aesthetic wall skin sheet 500 is inserted into a complimentary recess 370 on joining edge 325 of the backer guide 350 of the first aesthetic wall skin sheet 310 to form a finger joint. Likewise, each tab 360 located along joining edge 325 of the first aesthetic wall skin sheet 310 is at the same time inserted into a complimentary recess 570 located along the joining edge 525 of the backer guide 550 of the second aesthetic wall skin sheet 500 to form a finger joint.

Once the first aesthetic wall skin sheet 310 and second aesthetic wall skin sheet 500 have been so joined together along their complimentary joining edges any previously visually exposed fastener areas 380 of backer guide 350 (and any fasteners installed in them) of the first aesthetic wall skin 310 that extended beyond the peripheral edge 390 of body 315 of the first aesthetic wall skin sheet 310 will be covered and concealed from view by the now overlapping periphery edge 590 of body 515 of second aesthetic wall skin sheet 500. Tabs 360 will also be concealed from view when located in recesses 570 that are beneath body 515 of second aesthetic wall skin sheet 500. Likewise, any previously visually exposed fastener areas 580 of backer guide 550 (and any fasteners installed in them) of the second aesthetic wall skin 500 that may extend beyond the peripheral edge 590 of body 515 of the second aesthetic wall skin sheet 500 will be covered and concealed from view by the now overlapping periphery edge 390 of body 315 of first aesthetic wall skin sheet 310. Tabs 560 will also be concealed from view when located in recesses 370 that are beneath body 315 of first aesthetic wall skin sheet 310. Additional wall skin sheets (e.g. sheets 600 and 700 shown in FIG. 15) can be installed in similar fashion until the desired area of wall surface is covered. Outer edges of a wall skin covering 318 may be trimmed using conventional tools to conform to the desired outer edge appearance.

While aesthetic wall skin sheet 310 with backer guide 350 of the present invention may be manufactured using any conventional materials or manufacturing processes, it is contemplated that the present invention would be made from environmentally friendly materials such as, by way of example and not limitation, paper pulp from recycled paper products. More specifically, it is contemplated that aesthetic wall skin sheets 310 of the present invention would be made from a pulp composition comprised mostly of materials from recycled and/or biodegradable sources, such as by way of example, recycled newsprint or paper products. It is further contemplated in the preferred embodiment that the aesthetic wall skin sheets of the present invention and/or backer guides be manufactured using a Type 3 molded fiber product thermoform process.

Molded fiber products manufactured with waste paper or other natural fibers (which are essentially cellulose) are recyclable, biodegradable, and compostable where facilities are available. They can also be incinerated without damaging incinerators. Both fiber & water are recycled and reused in manufacturing, resulting in minimal waste. There are also no toxic or hazardous waste materials expelled into the environment.

There are different processes used for manufacturing molded fiber products. One method for manufacturing a wall skin is the slush molding (i.e. "Type 1") molded fiber product process. In slush molding the wall skin is manufactured from a liquid paper fiber mixture which is placed into a mold that has been fabricated to impart the desired shape and/or ornamental elements to the aesthetic wall skin sheet to be produced. Liquid is then extracted from the fiber mixture in the mold under vacuum pressure. Once the desired amount of liquid has been removed the resulting aesthetic wall skin sheet part is removed from the mold and placed in an oven having an elevated temperature to be dried (i.e. cured).

Another type of pulp molding process is the "thermoformed fiber" process, also known as Type 3 pulp molding. In Type 3 pulp molding heated molds are utilized. These heated molds make the product more precise in shape and the material denser. The heated molds also make it unnecessary to have a drying step.

Figure 18:
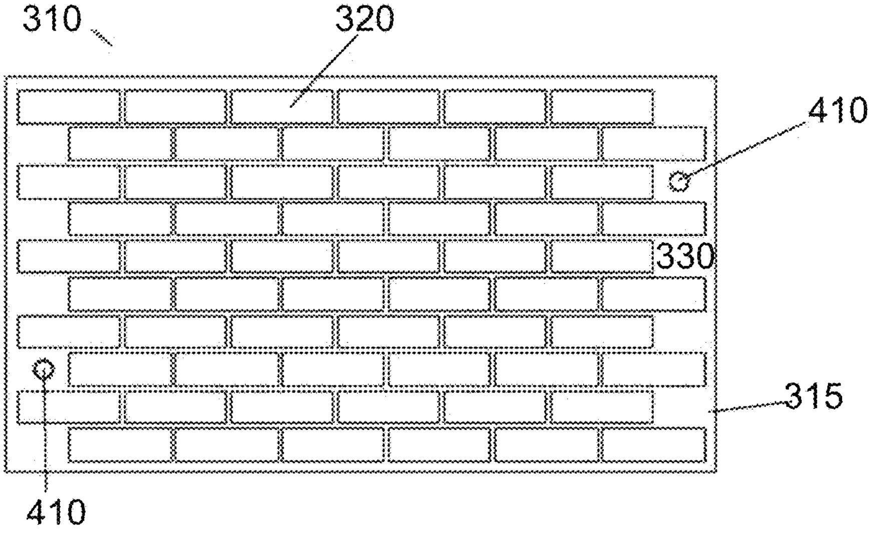
FIG. 18 is a top view of a wall skin sheet molded part with locators before die cutting.

Referring generally to FIG. 18, in the contemplated Type 3 molded fiber product thermoform process the wall skin sheet and/or backer guide are still made from a liquid paper fiber mixture, but instead use heated molds without any oven drying step.

Generally speaking, there is a male mold and female mold that are made to impart the desired shape and/or ornamental elements to the aesthetic wall skin sheet to be produced when the male and female molds are joined together. The paper fiber mixture is held in a space that is formed between the male mold and female mold when they are joined together. Liquid is removed from the paper fiber mixture in the mold by applying suction, pressure and/or heat. The male and female molds are heated, and the paper fiber mixture remains in the mold space until it is fully dry. The male and female molds are then separated so that the dried thermoformed aesthetic wall skin sheet part can be removed.

Examples of tools and techniques that might be used in thermoforming the wall skin sheets of the present invention include, by way of example and not limitation, those described and shown in U.S. Pat. No. 8,246,784 (Nilsson et al) and U.S. Pat. No. 9,243,369 (Huang) the contents of each of which are hereby fully incorporated by reference.

Figure 19:
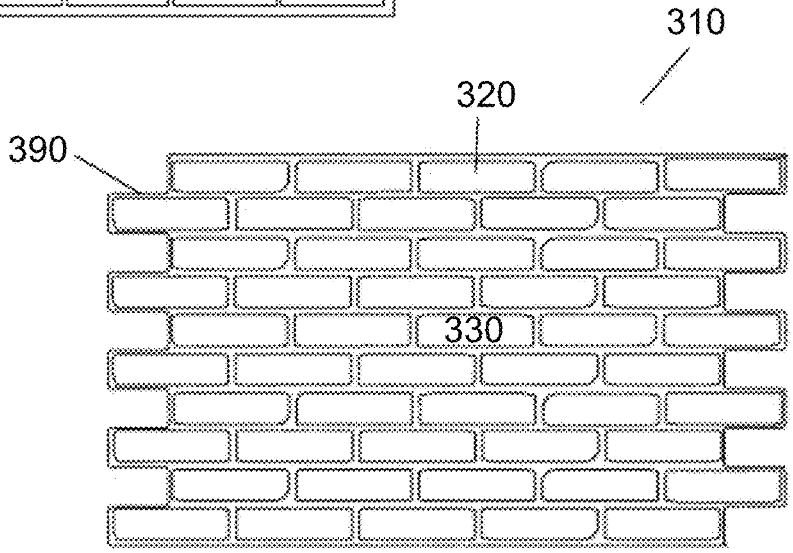
FIG. 19 is a top view of a wall skin sheet after die cutting.
Figure 20:
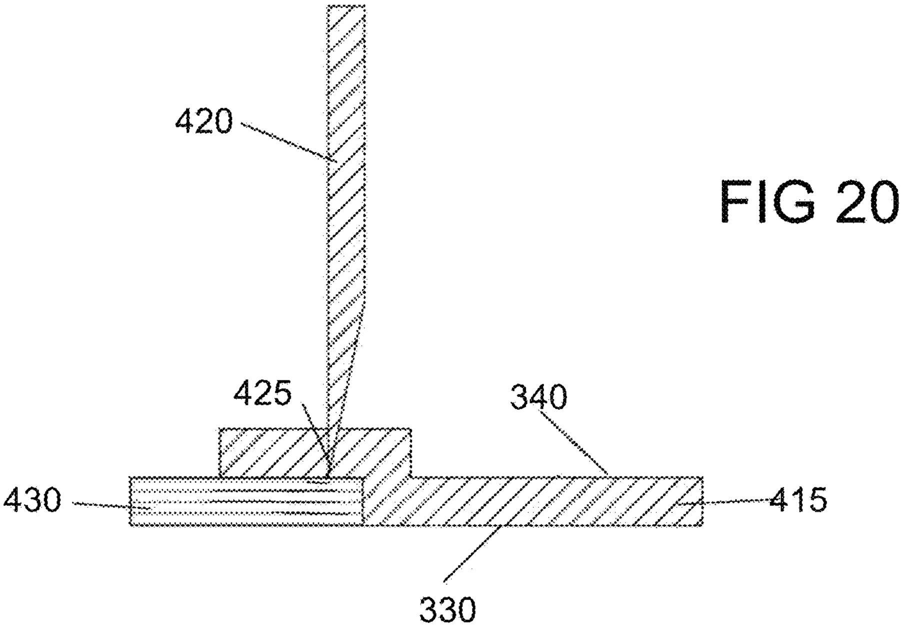
FIG. 20 is a front cross-sectional view of a die blade cutting a wall skin sheet with the top side facing down.
Figure 21:
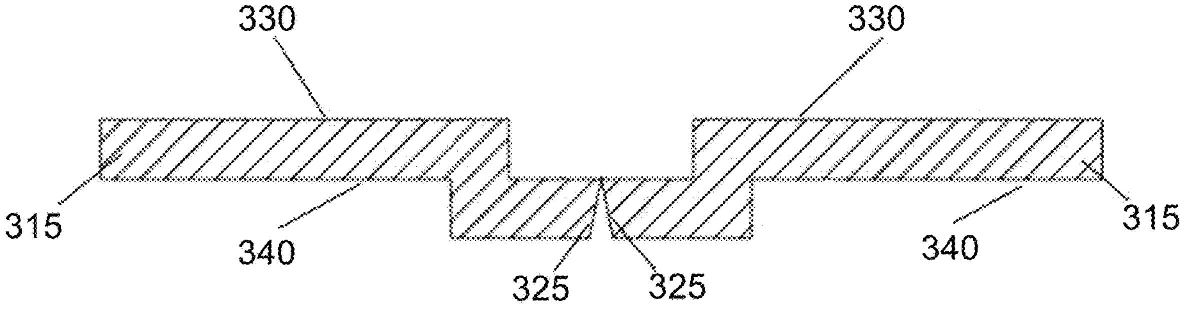
FIG. 21 is a front cross-sectional view of a seam formed by peripheral edges of two adjacent wall skin sheets showing the benefit of die cutting with the top surface facing down.

Referring to FIG. 18, it is contemplated that wall skin sheet locators 410 (e.g. holes, depressions, protrusions, pegs etc. . . . ) are preferably included in wall skin sheet 310. Locators 410 are used in die cutting to aid in cutting with the desired accuracy and consistency aesthetic wall skin sheets 310 to a shaped pattern having body 315 with periphery edge 390 that preferably extends past the outermost edge of ornamental elements 320 as shown in FIG. 19. Referring to FIGS. 20 and 21, in the preferred process of manufacturing aesthetic wall skin sheets of the present invention the aesthetic wall skin sheet parts that are obtained from the molding process are die-cut using a die blade 420 and die platen 430 with top surface 330 facing down so that when adjacent wall skin sheet joining edges 525 are brought together the seam will be very tight with no visually perceptible gap. This is because die blade 420 generally has the sharpest point 425 reaching the lowest point of the object being cut.

It is contemplated that front surface 330, including ornamental elements 320, may have colors, designs, and/or images applied to them to convey the desired visual impression (e.g. red clay brick, river rocks, etc. . . . ). One preferred method of accomplishing this is to use an industrial digital printing press. Use of an industrial digital printing press is contemplated to involve placement of aesthetic wall sheet skin onto a conveyer belt or table system used for moving and/or positioning the aesthetic wall sheet skin in the digital printing press during printing. It is contemplated that, as is often the case, the aesthetic wall skin sheet would be secured in place on the conveyer belt under suction pressure from a vacuum system. Aesthetic wall skin sheets of the present invention made with the preferred Type 3 molded fiber product thermoforming process will be thinner and easier to secure under vacuum pressure to the conveyor belt or table system of the digital printing press. They will also have a better front surface for printing on. Digital art files used for printing the aesthetic wall skin sheets may need to be adjusted to account for the material composition and/or embossed contours of the ornamental elements.

Figure 22:
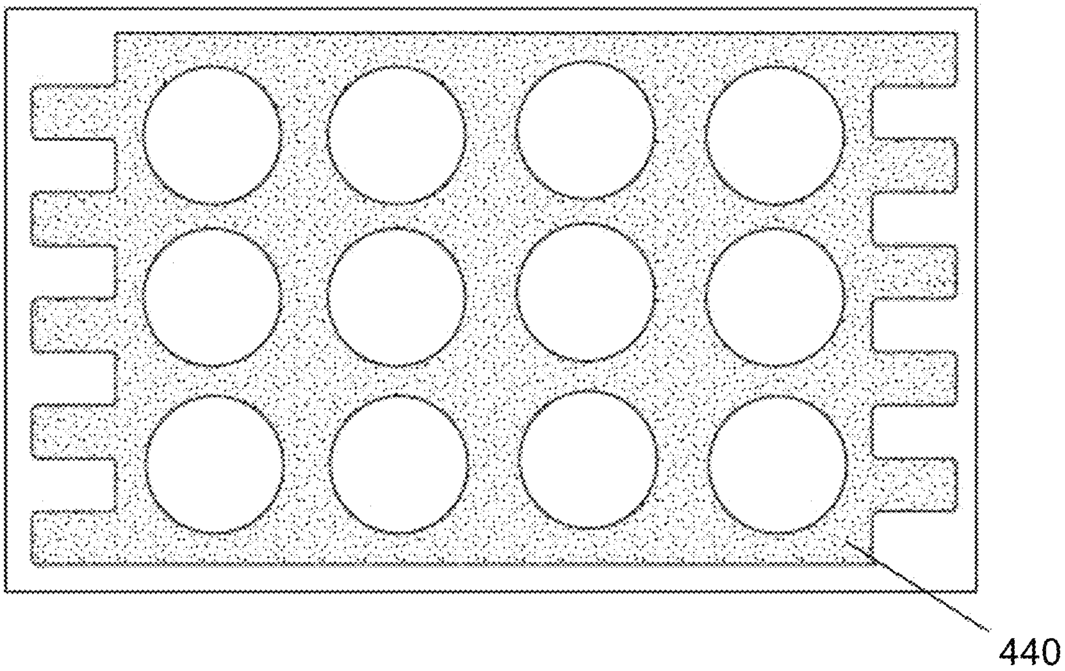
FIG. 22 is a top view of a jig with a cut-out pattern and ventilation holes that may be used to keep in position a wall skin sheet on a conveyor belt or table system of a digital printing press.
Figure 23:
FIG. 23 is a front view of the jig of FIG. 22.

It is contemplated that utilizing a jig to help secure the aesthetic wall skin sheet to the conveyor belt or table system of the digital printing press will be beneficial. This is particularly so if the front surface of the aesthetic wall skin sheet is to be printed prior to attaching the backer guide. Referring to FIGS. 22 and 23 an exemplary embodiment of a printing press jig 440 is shown.

The description and illustrations herein disclose exemplary embodiments and uses of applicants prior and present inventions. The prior and present inventions are susceptible to modifications in the configurations and uses, as well as alterations in the manufacturing methods and equipment. Consequently, it is not intended that present invention claimed herein be limited to the specific embodiments disclosed herein, but that it cover all modifications and alternatives coming within the true scope and spirit of the invention as embodied in the attached claims.

The invention claimed is:

1. A tool for use in making aesthetic wall coverings by slush molding comprising:

a porous tool base;

a flat screen attached to said base; and a patterned grid attached to said flat screen and said base.

2. The tool according to claim 1, wherein said patterned grid is comprised of a plurality of grid members forming a pattern.

3. The tool according to claim 1, further comprising a locator peg extending out from said flat screen.

4. The tool according to claim 1, wherein said patterned grid is configured to replicate cement block, brick, or tile.

5. The tool according to claim 1, further comprising caulk located on said flat screen and adjacent to said patterned grid.

6. The tool according to claim 1, wherein said porous tool base is made of steel or aluminum.

7. The tool according to claim 1, wherein the flat screen is made of material comprising copper.

8. The tool according to claim 1, wherein said porous tool base defines a plurality of drain holes.

* * * * *